(12) United States Patent
Adrian et al.

(10) Patent No.: US 6,461,089 B2
(45) Date of Patent: Oct. 8, 2002

(54) INTERCHANGEABLE PART FOR WORKPIECE FIXTURE

(75) Inventors: Rolf Adrian, Durach; Horst Reidl, Ettlingen, both of (DE)

(73) Assignee: Liebherr-Verzahntechnik GmbH, Kempten (DE)

(*) Notice: Subject to any disclaimer, the term of this patent is extended or adjusted under 35 U.S.C. 154(b) by 0 days.

(21) Appl. No.: 09/909,125

(22) Filed: Jul. 20, 2001

(65) Prior Publication Data

US 2002/0017753 A1 Feb. 14, 2002

(30) Foreign Application Priority Data

Jul. 21, 2000 (DE) .......................... 200 12 706

(51) Int. Cl.[7] .................. B23F 23/06; B23B 31/00; B23Q 3/02
(52) U.S. Cl. .................. 409/62; 279/76; 403/16; 409/232
(58) Field of Search .................. 409/62, 232, 234, 409/233, 231; 279/76, 137, 141, 145, 103; 403/16, 19; 408/239 A, 239 R, 238; 269/99, 205, 207, 909; 82/160, 150; 29/33 P

(56) References Cited

U.S. PATENT DOCUMENTS

| | | | | |
|---|---|---|---|---|
| 1,019,110 A | * | 7/1912 | Woods | 279/103 |
| 2,467,819 A | * | 4/1949 | Firth | 403/16 |
| 2,503,860 A | * | 4/1950 | Williams | 403/16 |
| 3,622,169 A | * | 11/1971 | Koch | 279/76 |
| 3,664,227 A | * | 5/1972 | Fischer | 409/62 |
| 3,684,302 A | * | 8/1972 | Herman | 279/75 |
| 4,519,722 A | * | 5/1985 | Shank et al. | 403/16 X |
| 4,662,043 A | * | 5/1987 | Stone et al. | 29/33 P |
| 5,192,142 A | * | 3/1993 | Hyll | 403/16 |
| 5,393,165 A | * | 2/1995 | Rowan | 403/301 |
| 5,678,945 A | * | 10/1997 | Fimeri | 403/16 X |
| 5,797,605 A | * | 8/1998 | Gross et al. | 82/150 |
| 5,967,713 A | * | 10/1999 | Watzke | 408/239 A |

* cited by examiner

Primary Examiner—William Briggs
(74) Attorney, Agent, or Firm—Jagtiani & Guttag

(57) ABSTRACT

A workpiece fixture for gear cutting machines and an interchangeable part for said workpiece fixture are adapted to each other. One end of the interchangeable part is used for fixation to the workpiece fixture and has on the one hand a face with at least one ramp extending in the circumferential direction relative to a rotation axis, and a locking element, the locking element cooperating with a locking element of the workpiece fixture so as to permit separation of the locked interchangeable part from the workpiece fixture only if a minimum force is overcome. The workpiece fixture has for its part in addition to the aforementioned locking element a surface formed cylindrically, at least in parts, relative to a rotation axis as a radial bearing surface for the interchangeable part, and a stop face or at least one radially protruding stop pin which cooperates axially with the ramp of the interchangeable part.

24 Claims, 2 Drawing Sheets

INTERCHANGEABLE PART FOR WORKPIECE FIXTURE

Figure 1:
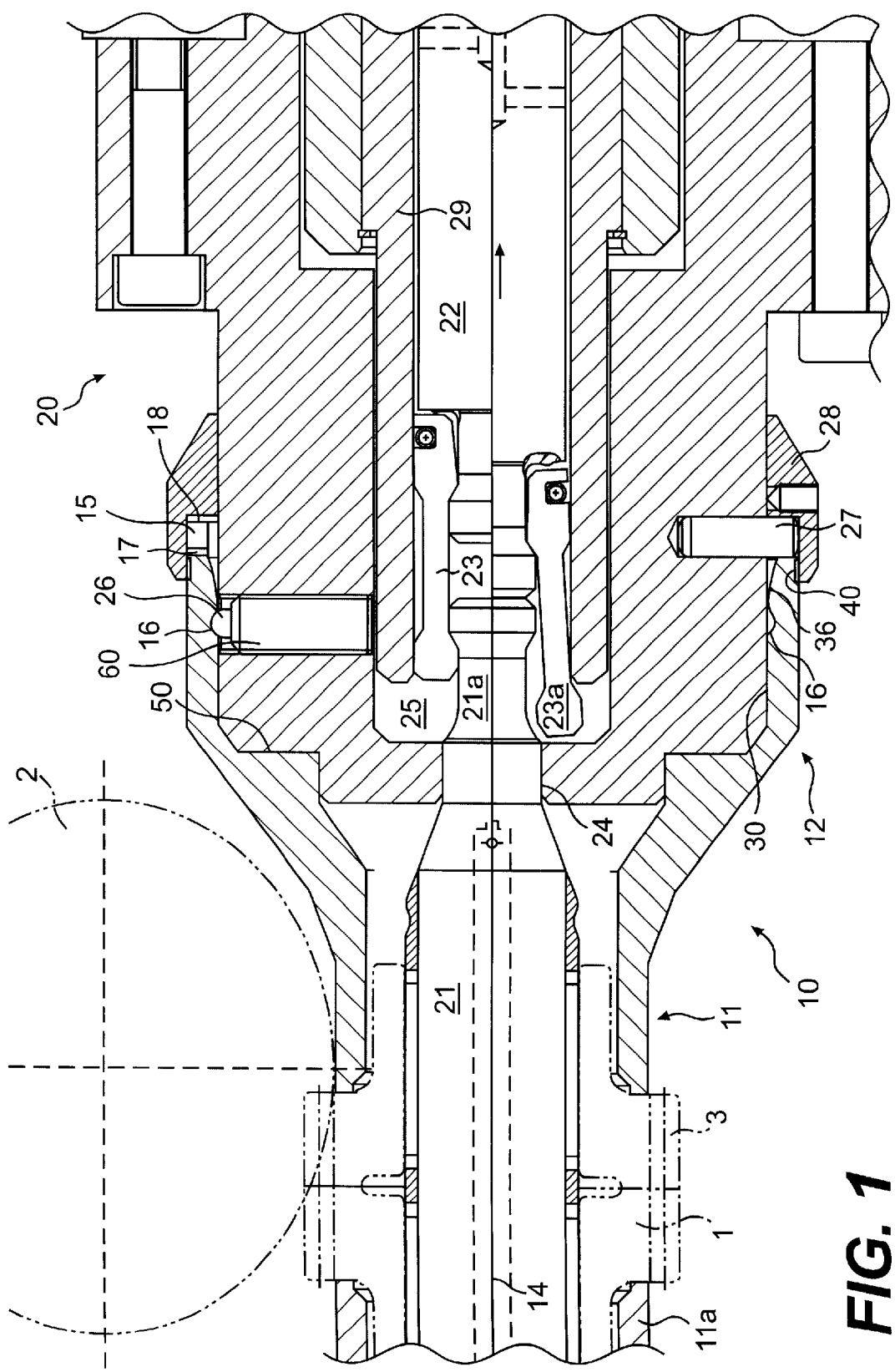

The present invention relates to an interchangeable part for a workpiece fixture, in particular of gear cutting machines, and to a workpiece fixture adapted to the interchangeable part and to a system comprising interchangeable part and workpiece fixture.

Workpiece fixtures are used to fix a workpiece in a given position for machining. The higher the requirements for machining precision are, the more expensive such workpiece fixtures are. This holds in particular for workpiece fixtures for gear cutting machines. Therefore one normally attempts to construct workpiece fixtures so that they can fix a plurality of different workpieces. This requires interchangeable parts which are inserted as intermediate parts between the workpiece to be clamped and the workpiece fixture. A first end of such an interchangeable part is specially adapted for receiving a specific type of workpiece and a second end of the interchangeable part is used for fixing the interchangeable part on the workpiece fixture.

Usually, said interchangeable parts are connected firmly with the workpiece fixture by screws. Reliable connection of the interchangeable part with the workpiece fixture is necessary for functional reasons because otherwise the adhesive effect of the coolant used in the machining process leads to the danger of the interchangeable part sticking to the finished workpiece upon removal of the latter from the machining tool. However, when the workpiece fixture is changed over from one type of workpiece to another type of workpiece the screw connection involves considerable effort and accordingly long change-over times due to the loosening and retightening of the screws. The resulting production downtimes are cost-intensive and therefore undesirable.

The present invention is based on the problem of proposing an interchangeable part for a workpiece fixture and a workpiece fixture adapted to such an interchangeable part which ensure reliable connection between interchangeable part and workpiece fixture, on the one hand, and rapid replacement of interchangeable parts, on the other hand.

The invention relates to two essential aspects or elements which are each realized partially in the interchangeable part and partially in the workpiece fixture and adapted to each other so as to permit optimal cooperation. Specifically, the one essential aspect is a locking connection between the interchangeable part and the workpiece fixture to ensure that the interchangeable part is firmly connected with the workpiece fixture after being locked in. The other essential aspect is a force amplifying device for releasing the locked-in interchangeable part from the workpiece fixture when one interchangeable part is to be replaced by another interchangeable part.

The locking connection includes two locking elements, one on the interchangeable part and the other on the workpiece fixture, which cooperate so as to permit separation of the locked-in interchangeable part from the workpiece fixture only if a minimum force is overcome. Specifically, the locking elements can be formed as a depression or groove, on the one hand, and an elastically deformable element, such as a spring-loaded pin, engaging the depression or groove, on the other hand. It is irrelevant whether the depression/groove or the elastically deformable element is mounted on the interchangeable part. For reasons of design and cost, however, it is preferable to provide the depression or groove, which can be produced in simple and space-saving fashion, on the interchangeable parts and integrate the elastically deformable element, which is more elaborate and larger in contrast, in the workpiece fixture.

The force amplifying device is realized on a face of the end of the interchangeable part used for fixation on the workpiece fixture, in the form of at least one ramp extending in the circumferential direction relative to a rotation axis, whereby at least one stop face or stop pin is disposed on the workpiece fixture opposite said ramp in order to cooperate with the ramp of the interchangeable part. In the locked condition the face of the interchangeable part lies against the stop face or stop pin or is directly adjacent thereto. Upon rotation of the locked interchangeable part about the rotation axis, an axial force acting in the direction of the rotation axis is then applied to the stop face or stop pin of the workpiece fixture via the inclined ramp surface. This leads to displacement of the interchangeable part in the axial direction relative to the workpiece fixture, thereby releasing the locking connection under constraint. The flatter the inclination of the ramp is selected, the greater the angle of rotation is about which the locking element must be rotated for release from the workpiece fixture, but the lower the force is which must be applied for overcoming the biasing force of the locking connection.

Preferably a plurality of ramps are uniformly distributed concentrically about the rotation axis on the face of the interchangeable part, and preferably an equal number of stop pins are uniformly distributed in the circumferential direction over the cylindrical surface of the workpiece fixture. This ensures uniform force distribution relative to the rotation axis and avoids jamming of the interchangeable part on the workpiece fixture upon release of the connection. The smallest ramp inclination and accordingly the lowest necessary expenditure of force for releasing the interchangeable part from the workpiece fixture results when the ramps distributed uniformly over the face of the interchangeable part are adjacent and form notches and prongs. The root of the notches is preferably slightly lower than the imaginary intersection point of the adjoining ramps, which makes the moment of locking clearly perceptible.

Figure 2:
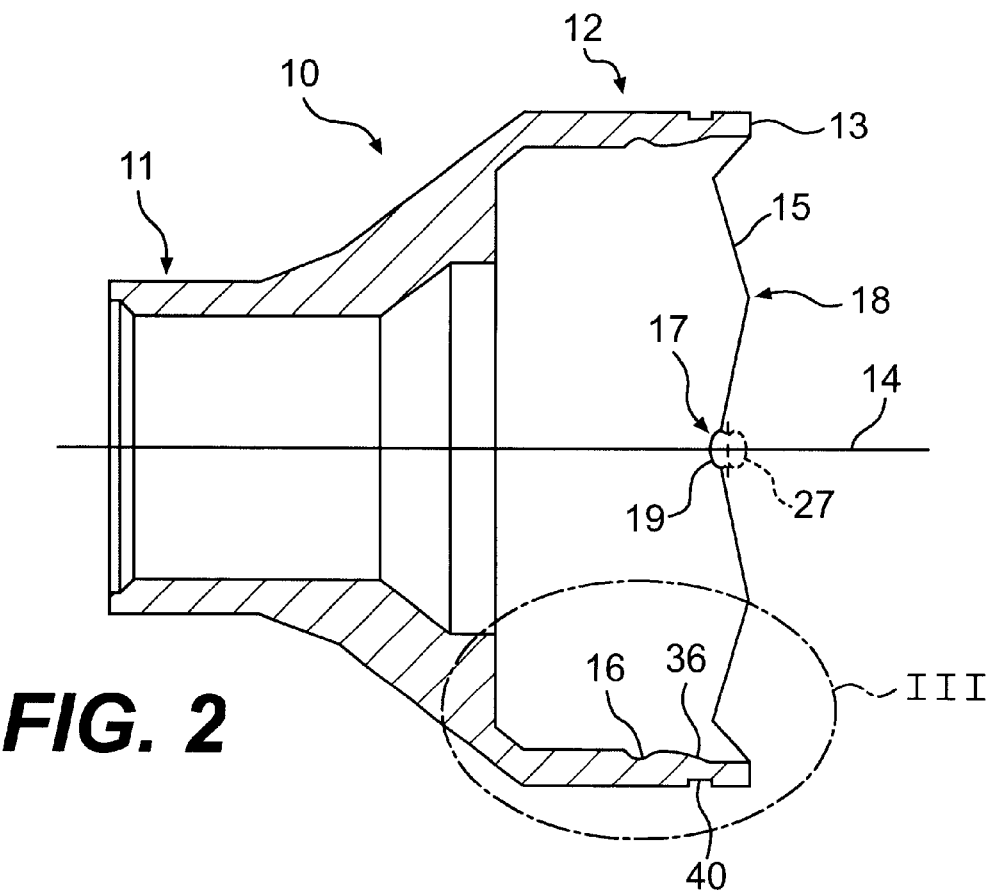
Figure 3:
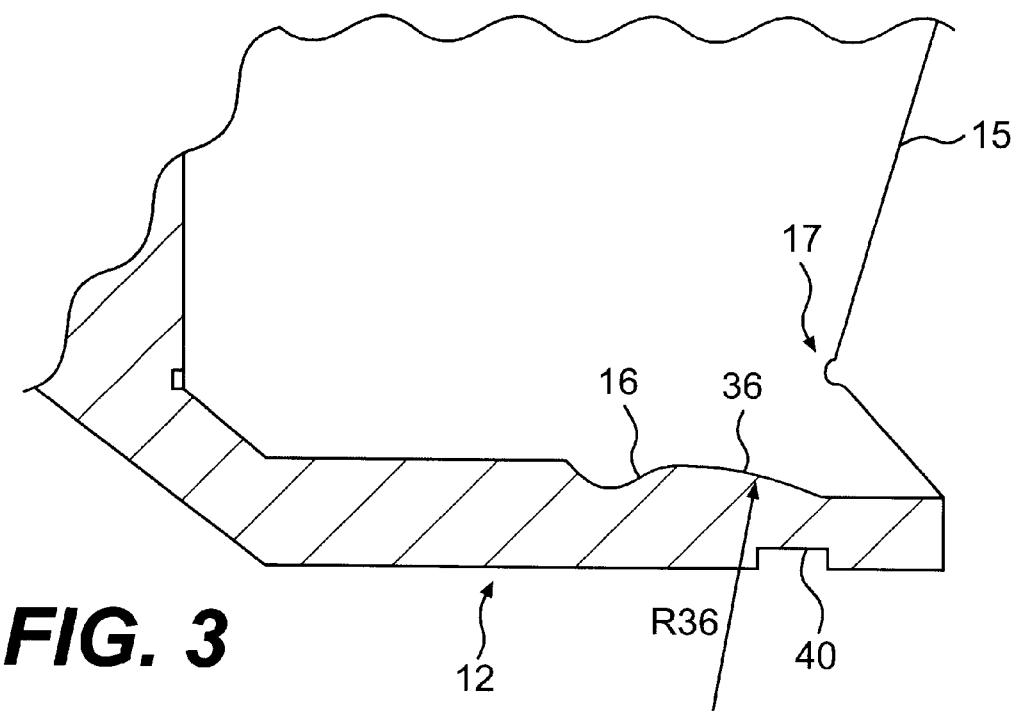

In the following the invention will be described by way of example with reference to the accompanying drawings, in which:

FIG. 1 shows workpiece fixture 20 with locked-in interchangeable part 10 and workpiece 1 to be machined, FIG. 2 shows interchangeable part 10 according to the present invention, and FIG. 3 shows a detail of interchangeable part 10 shown in FIG. 2.

FIG. 1 shows workpiece fixture 20 with interchangeable part 10 connected therewith and workpiece 1 clamped with interchangeable part 10. In addition, it schematically shows gear cutting tool 2, for example a tooth form cutter or hob cutter, and toothing 3 produced on workpiece 1 with gear cutting tool 2.

The clamping of workpiece 1 and interchangeable part 10 with workpiece fixture 20 is obtained as follows. Workpiece 1 is seated on cylindrical body 21 whose end 21a is introduced into cavity 25 of workpiece fixture 20 through precisely fitting opening 24. At this time, pull rod 22 and clamping wedges 23 shown in FIG. 1 are in their left-hand or open position (lower view in FIG. 1) in which clamping wedges 23 are freely slewable to a slight degree. This slewability suffices for pushing end 21a of cylindrical body 21 behind clamping wedge ends 23a. Pull rod 22 is thereupon displaced into its locking position (upper view in FIG. 1), in the direction of the arrow to the right in the case shown in FIG. 1. This causes ends 23a of clamping wedges 23 to jam between an inner surface of bush 24 and an undercut of free end 21a of cylindrical body 21. This first causes workpiece 1 to be disposed in rotational symmetry to axis 14.

Upon displacement of pull rod 22 into its locking position, workpiece 1 is simultaneously clamped in the axial direction between left end 11 of interchangeable part 10 and workpiece-specific clamping sleeve 11a, clamping sleeve 11a being firmly connected with cylindrical body 21 (not shown in FIG. 1), for example in the same manner as interchangeable part 10 is connected with workpiece fixture 20. Displacement of pull rod 22 to the right (in the direction of the arrow) then causes cylindrical body 21 to be likewise pulled to the right by means of clamping wedges 23, so that clamping sleeve 11a exerts a force acting toward the right on workpiece 1 which comes to rest against left end 11 of interchangeable part 10, thereby urging interchangeable part 10 against face 50 of workpiece fixture 20. In this condition workpiece 1 is thus clamped in reliable and positionally accurate fashion without further measures being necessary.

After being machined the workpiece is then released from the clamping by movement of pull rod 22 contrary to the direction of the arrow until it hits free end 21a of cylindrical body 21. Cylindrical body 21 with workpiece 1 disposed thereon is thereby released from the supporting ring of interchangeable part 10, and machined workpiece 1 can be taken from the machining tool.

Normally, there are considerable adhesive forces acting between workpiece 1 and interchangeable part 10 which are caused by the coolant used during the machining operation. In order to prevent interchangeable part 10 from sticking to workpiece 1 upon release of cylindrical body 21, locking connection 16, 26 is provided between interchangeable part 10 and workpiece fixture 20. Specifically, interchangeable part 10 has depression 16 which is preferably formed for reasons of production engineering as a groove running around rotation axis 14 in end 12 of interchangeable part 10. This is shown separately and enlarged in FIGS. 2 and 3. Groove 16 is engaged by pin 26 which is in turn held in body 60 screwed to workpiece fixture 20 and is urged into depression or groove 16 by a biasing spring (not shown) received in body 60.

Stop face 36 is provided between face 13 and depression or groove 16 with a slight radial inclination (FIG. 3) along which the head of spring-loaded pin 16 runs when interchangeable part 10 is slipped onto workpiece fixture 20. Spring-loaded pin 16 protruding from the workpiece fixture is thereby urged down against the spring power without any special expenditure of force until it locks into depression or groove 16. Stop face 36 is preferably curved convexly and has radius R36 which is about half the distance between stop face 36 and rotation axis 14, e.g. 30 mm.

Locking connection 16, 26 prevents axial displacement of interchangeable part 10 relative to workpiece fixture 20 as long as a minimum force acting in the axial direction is not exceeded. When interchangeable part 10 is replaced by another interchangeable part this minimum axial force must be expended. This is done by rotating interchangeable part 10 about rotation axis 14. In order to permit rotation of interchangeable part 10, interchangeable part 10 rests on likewise (at least partially) cylindrical surface 30 of workpiece fixture 20. Upon rotation of interchangeable part 10, face 13 of end 12 of interchangeable part 10 which is formed as ramps 15 moves along one or more stop pins 27. Stop pins 27 are stationary and protrude radially from workpiece fixture 20 so that the rotation of interchangeable part 10 necessarily results in axial displacement of interchangeable part 10, to the left in the case shown in FIG. 1. This can be easily understood with reference to FIG. 2. Rotation of interchangeable part 10 about rotation axis 14 causes, stop pin 27 being stationary, displacement of interchangeable part 10 away from stop pin 27, that is to the left in the example shown.

Ramps 15 are distributed uniformly over face 13 of interchangeable part 10 and are adjacent so as to form notches 17 and prongs 18 (FIG. 2). It is thus irrelevant in which angular position interchangeable part 10 is slipped onto workpiece fixture 20. Preferably a plurality of stop pins 27 are also uniformly distributed over the circumference of cylindrical surface 30 of workpiece fixture 20 so that the axial forces produced upon release of interchangeable part 10 from workpiece fixture 20 are transferred uniformly onto face 13.

Root 19 of notches 17 between two adjacent ramps 15 is slightly lower than the imaginary intersection point of said two ramps 15 and is formed as a segment of a circle, its radius corresponding to the radius of stop pin 27. This somewhat accelerates the locking of locking connection 16, 26 at the last moment, making it clearly perceptible.

Finally, marking 40 is provided on the outer side of end 12 of interchangeable part 10, being visible in the released condition of interchangeable part 10 but covered by sleeve 28 in the locked condition of interchangeable part 10. Marking 40 is painted red as a safety marking. When said red marking is visible, this is a sign that interchangeable part 10 is not properly locked to workpiece fixture 20.

What is claimed is:

1. An interchangeable part, comprising:
   a first end for receiving a type of workpiece adapted thereto and a second end for fixing the interchangeable part on a workpiece fixture, wherein the second end has a face having at least one ramp extending in a circumferential direction relative to a rotation axis, and
   a first locking element adapted to cooperate with a second locking element of the workpiece fixture to create a locked interchangeable part, wherein the first locking element and second locking element permit separation of the locked interchangeable part from the workpiece fixture only if a minimum force is overcome.

2. An interchangeable part according to claim 1, wherein the first locking element is formed as a depression in the interchangeable part.

3. An interchangeable part according to claim 2, wherein the depression is formed as a groove extending in the circumferential direction relative to the rotation axis.

4. An interchangeable part according to claim 2, wherein a stop face extending in the direction of the rotation axis and having a slight radial inclination is provided between the face and the depression.

5. An interchangeable part according to claim 4, wherein the inclination of the stop face is curved and the radius of curvature is roughly 1:2 in relation to the distance of the stop face from the rotation axis.

6. An interchangeable part according to claim 1, wherein the first locking element is an elastically deformable element.

7. An interchangeable part according to claim 6, wherein the first locking element is a spring-loaded pin.

8. An interchangeable part according to claim 1, wherein a plurality of ramps are uniformly distributed on the face in the circumferential direction about the rotation axis.

9. An interchangeable part according to claim 8, wherein the ramps are distributed so as to be adjacent and form six notches and six prongs.

10. An interchangeable part according to any of claim 1, wherein between two adjacent ramps a notch is formed with a root that is slightly lower than an imaginary intersection point of the two ramps.

11. An interchangeable part according to claim 10, wherein the notch root has a curvature adapted to the radius of a stop pin of a workpiece fixture.

12. An interchangeable part according to claim 1, wherein a conspicuous marking is provided in an area of an outwardly visible surface of the second end such that the marking is adapted to be covered by an element of the workpiece fixture in the locked condition.

13. A workpiece fixture adapted for use with an interchangeable part, said workpiece fixture comprising:

a surface formed cylindrically, at least in parts, relative to a rotation axis as a radial bearing surface for an interchangeable part, at least one stop face or stop pin which protrudes from the workpiece fixture substantially radially relative to the rotation axis and serves to cooperate with at least one ramp of an interchangeable part in the axial direction relative to the rotation axis, and a second locking element adapted to cooperate with a first locking element of an interchangeable part to create a locked interchangeable part, wherein the second locking element and first locking element permit separation of the locked interchangeable part from the workpiece fixture only if a minimum force is overcome.

14. A workpiece fixture according to claim 13, wherein the second locking element is an elastically deformable element.

15. A workpiece fixture according to claim 14, wherein the second locking element is a spring-loaded pin.

16. A workpiece fixture according to claim 13, wherein the second locking element is formed as a depression.

17. A workpiece fixture according to claim 16, wherein the depression is formed as a groove extending in the circumferential direction relative to the rotation axis.

18. A workpiece fixture according to claim 16, wherein the cylindrical surface has on its end facing the interchangeable part a stop face extending in the axial direction relative to the rotation axis and having a slight radial inclination.

19. A workpiece fixture according to claim 18, wherein the inclination of the stop face is curved and the radius of curvature is roughly 1:2 in relation to the distance of the stop face from the rotation axis.

20. A workpiece fixture according to claim 13, wherein a sleeve is provided which is adapted to cover an otherwise outwardly visible area of the interchangeable part in the condition of locking with an interchangeable part.

21. A workpiece fixture according to claim 13, wherein a plurality of stop pins protrude from the cylindrical surface, being uniformly distributed in the circumferential direction.

22. A workpiece fixture according to claim 21, wherein six stop pins are provided.

23. A system comprising:

a workpiece fixture, comprising:

a surface formed cylindrically, at least in parts, relative to a rotation axis as a radial bearing surface for an interchangeable part, at least one stop face or stop pin which protrudes from the workpiece fixture substantially radially relative to the roation axis and serves to cooperate with at least one ramp of an interchangeable part in the axial direction relative to the rotation axis, and a second locking element adpated to cooperate with a first locking element of an interchangeable part to create a locked interchangeable part; and a interchangeable part, comprising:

a first end for receiving a type of workpiece adapted thereto and a second end for fixing the interchangeable part on the workpiece fixture, wherein the second end has a face having at least one ramp extending in a circumferential direction relative to a rotation axis, and a first locking element adapted to cooperate with a second locking element of a workpiece fixture to create a locked interchangeable part, wherein the first locking element and second locking element permit separation of the locked interchangeable part from the workpiece fixture only if a minimum force is overcome.

24. An interchangeable part of claim 1, wherein the interchangeable part for the workpiece fixture is a gear cutting machine.

* * * * *